INVENTOR.
EUGENE N. SCHROEDER
BY
ATTORNEYS

INVENTOR
EUGENE N. SCHROEDER
BY Wade Koontz and Martin J. Finnegan
ATTORNEYS

INVENTOR.
EUGENE N. SCHROEDER
BY Wade Koontz
Martin J. Finnegan
ATTORNEYS

INVENTOR.
EUGENE N. SCHROEDER
BY Wade, Koontz and Martin J. Finnegan
ATTORNEYS 3,402,392

TIME DIVISION MULTIPLEX MATRIX DATA TRANSFER SYSTEM HAVING TRANSISTOR CROSS POINTS

Eugene N. Schroeder, Bethesda, Md., assignor to the United States of America as represented by the Secretary of the Air Force Filed Sept. 24, 1964, Ser. No. 398,811
2 Claims. (Cl. 340—166)

ABSTRACT OF THE DISCLOSURE

A cross point gate system in which the input signal is applied to a first transistor and the time slot is controlled by a switch transistor connected to the first transistor. A clamp circuit is connected to the switch transistor for periodic discharge of line capacity.

This invention relates to data transfer, and particularly to the transfer of data from a plurality of data carrying lines to a plurality of data reception locations as, for examples, core type or drum type memory elements assembled for signal reception by selective gating of control circuits feeding the memory complex.

More specifically, the invention provides a line switching arrangement in which a plurality of output "highways" (trunk lines) are connected on a time-multiplexed basis to a plurality of output lines, and under the control of gating mechanism that directs a given signal control pulse associated with a particular "highway" to a particular output line in such manner that all other output lines associated with said signal carrying "highway" are excluded from signal reception during the operating time period, although that same time period may be utilized (in corresponding fashion) to transfer different signals by way of the other highways of the system, with each such signal traversing only one highway and arriving at only one output line.

Figure 1:
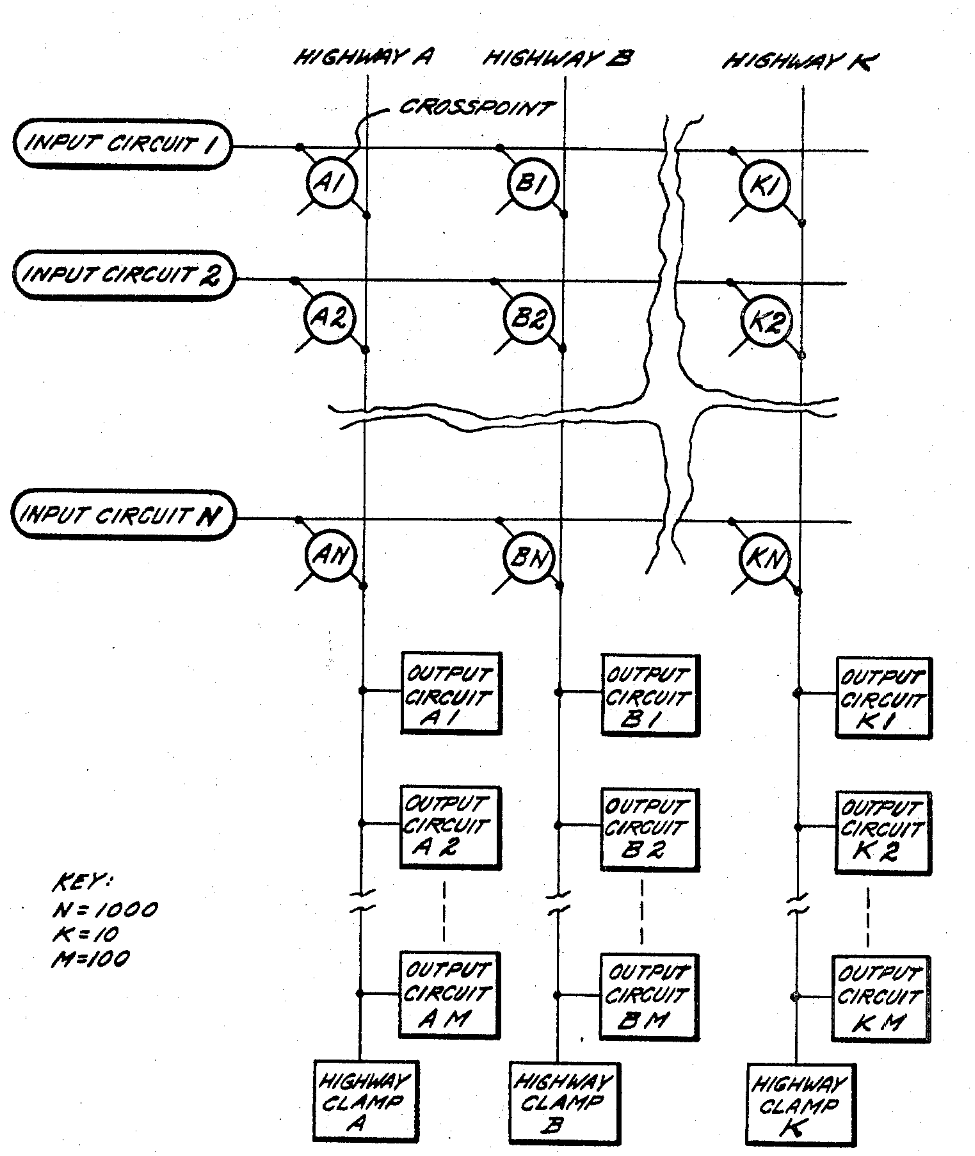
FIG. 1 is an overall block diagram showing the input circuits, the output circuits, the linking "highways," the "cross point" electrical bridges, and the cycle controlling "clamp" units, to be described.
Figure 2:
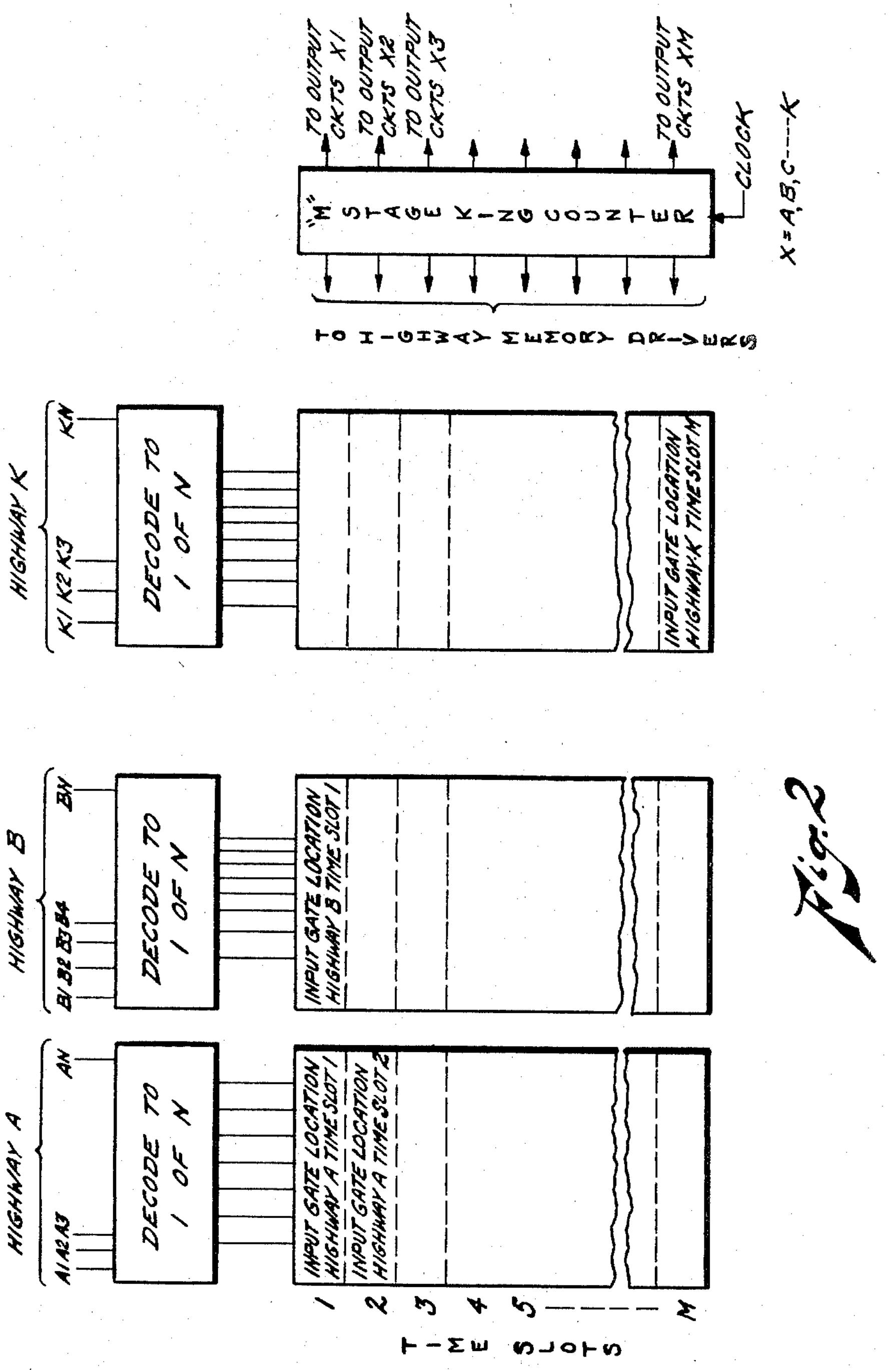
FIG. 2 is a block diagram of the memory assembly, showing also the ring counter and driving units that distribute the driving impulses to the individual "time slots" of each memory unit, in sequence, and simultaneously gates the individual output circuits, in corresponding sequence.

The basic block diagram of the system is shown in FIGS. 1 and 2. Each cross point is a simple time division gate closed in accordance with the instructions stored in the multiplex memory. Although the memory block diagram is shown as a core type memory, a drum or delay line memory is also suitable—the requirement being a cyclic readout based on time.

Figure 3:
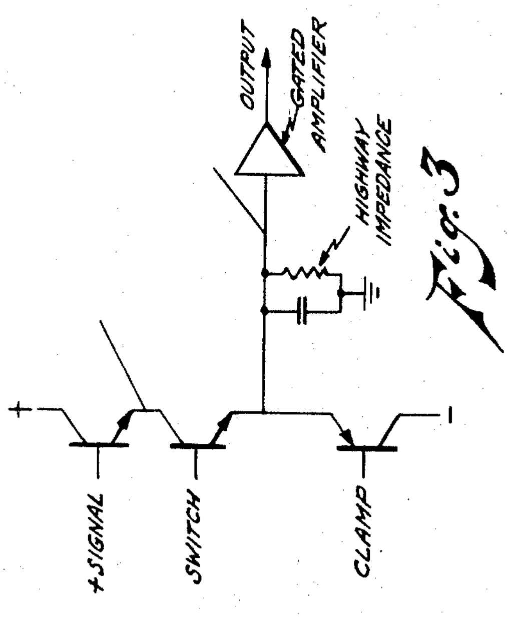
FIG. 3 is a diagram explanatory of the basic switching concept by which the "exclusive selection" objective is accomplished.

Each cross point gate must be low in cost. An illustrative implementation of this system wich can be low cost is therefore shown in FIGS. 3–7. FIG. 3 illustrates the basic concept. The input signal is placed upon a reference level such that it is always a positive voltage. This input is applied to a transistor in the emitter follower configuration. When the switch transistor is closed, current will flow and will develop the input signal voltage across the highway impedance. This voltage is amplified by a gated amplifier and applied to the output. Between samples, the line capacity is discharged by means of the highway clamp—also an emitter follower to provide high current capacity. This basic concept is expanded in detail in FIGS. 4–7.

Figure 5:
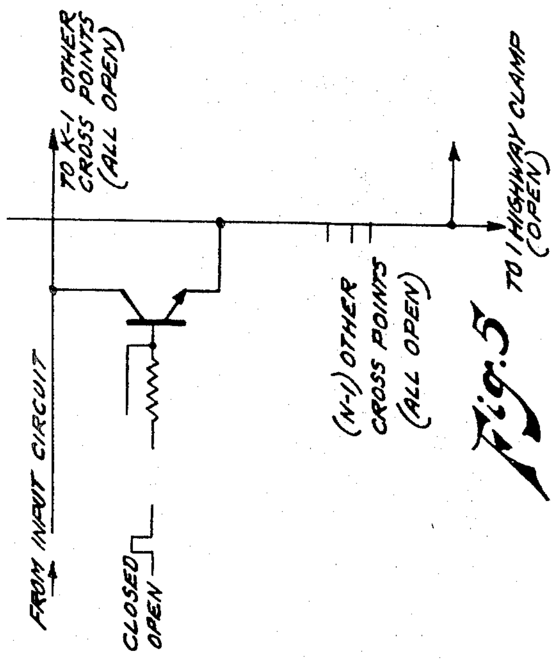
FIGS. 4 to 7*b*, inclusive, show the successive groups of circuit components for application to the system of the objective basically established by the control unit illustrated in FIG. 3.
Figure 6:
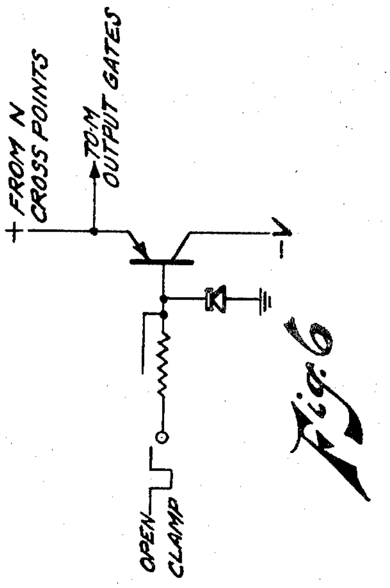
Figure 4:
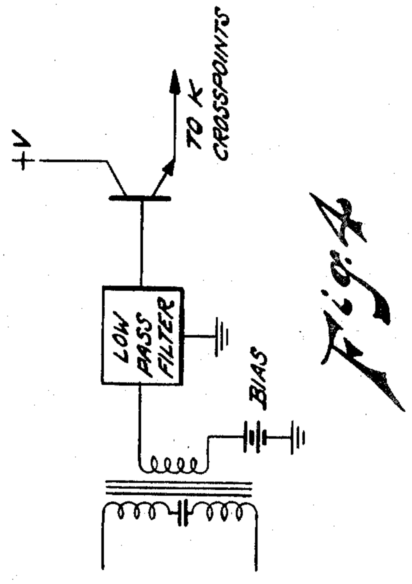
Figure 7A:
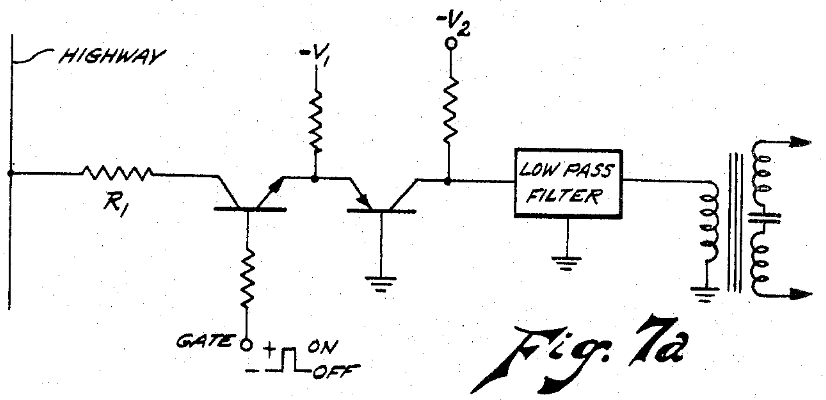
Figure 7B:
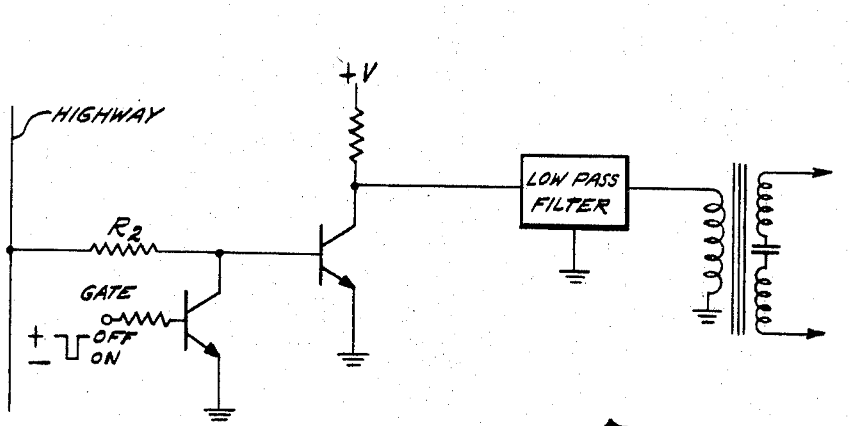

FIG. 4 illustrates the input circuit shown in FIG. 1. FIG. 5 illustrates the cross points and FIG. 6 the highway clamp that discharges the highway capacitance between sample pulses is shown. Two alternate output circuits for FIG. 1 are illustrated in FIGS. 7*a* and 7*b*. FIG. 7*a* is a series switch transistor gating the input to a grounded base amplifier stage. Resistor $R_1$ converts the highway voltage into an input current (bias $\pm$ signal) for the grounded base stage. FIG. 7*b* is a grounded emitter amplifier with the input controlled by a shunt switch transistor. This stage provides an output when the switch transistor is "turned off." Again, resistor $R_2$ provides a voltage to current conversion function.

In operation, each of K output circuits are gated on at a given time slot. Thus, each output is identified by a highway and a time slot. For a connection to be made to a specified output line, the location of the cross point corresponding to the output line highway and the desired input line is stored in the proper time slot position of the proper highway memory. At the proper time slot, the selected cross point and output circuit gates are closed. The input circuit emitter follower raises the highway voltage to that corresponding to the input. The output circuit converts this to a current and drives a pulse into the output low pass filter. Both the cross point and output circuit gates now open and the highway clamp returns the voltage on the highway to a zero level. In the next time slot, different cross points and output circuits are closed. However, for any one time slot, only one cross point and one output circuit are closed for any one highway, although a pair may be closed for each highway.

I claim:

1. A matrix cross point gate system for connecting a plurality of input lines with the plurality of highway lines comprising:

(a) an input transistor having an emitter and base and having an emitter follower configuration with the input signal being applied at the base;

(b) a switch transistor having an emitter and base with the emitter thereof being connected to the emitter of the input transistor and the switching signal being applied at the base;

(c) a reference level voltage source for keeping the input positive, the source being applied to the emitter of the input transistor; and (d) a gated amplifier connected to the emitter of the switch transistor.

2. A matrix cross point gate system according to claim 1 which further comprises a highway clamp circuit for discharging line capacity between signals, the highway clamp comprising:

(a) a clamp transistor having a base and emitter and having an emitter follower configuration with the emitter thereof connected to the emitter of the switch transistor and the clamp control voltage being applied at the base; and (b) a diode connected to the base of the clamp transistor.

References Cited

UNITED STATES PATENTS

| | | | |
|---|---|---|---|
| 3,141,067 | 7/1964 | Spandorfer | 340—166 |
| 3,229,253 | 1/1966 | Logue | 340—166 |
| 3,315,232 | 4/1967 | Feder | 340—166 |

JOHN W. CALDWELL, *Primary Examiner.*

H. PITTS, *Assistant Examiner.*